United States Patent
Chitgarha et al.

(10) Patent No.: US 9,625,320 B2
(45) Date of Patent: Apr. 18, 2017

(54) AUTOMATICALLY LOCKED HOMODYNE DETECTION

(71) Applicant: University of Southern California, Los Angeles, CA (US)

(72) Inventors: Mohammad Reza Chitgarha, Los Angeles, CA (US); Alan E. Willner, Los Angeles, CA (US); Amirhossein Mohajerin-Ariaei, Los Angeles, CA (US); Morteza Ziyadi, Los Angeles, CA (US); Salman Khaleghi, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 21 days.

(21) Appl. No.: 14/856,389

(22) Filed: Sep. 16, 2015

(65) Prior Publication Data
US 2016/0076941 A1    Mar. 17, 2016

Related U.S. Application Data

(60) Provisional application No. 62/051,245, filed on Sep. 16, 2014.

(51) Int. Cl.
*G01J 3/45* (2006.01)
(52) U.S. Cl.
CPC ........................................ *G01J 3/45* (2013.01)
(58) Field of Classification Search
CPC ....................................................... G01J 3/45

(Continued)

(56) References Cited

U.S. PATENT DOCUMENTS

| | | | | |
|---|---|---|---|---|
| 7,453,626 | B2 * | 11/2008 | Lett | G02F 1/3536 |
| | | | | 359/326 |
| 8,339,581 | B2 * | 12/2012 | Guha | G01C 3/08 |
| | | | | 356/3.01 |

(Continued)

OTHER PUBLICATIONS

Ariaei et al., "Experimental Demonstration of Simultaneous Phase Noise Suppression and Automatically Locked Tunable Homodyne Reception for a 20-Gbaud QPSK Signal," in CLEO: 2015, OSA Technical Digest (Optical Society of America, 2015), paper SW1M. 5.

(Continued)

*Primary Examiner* — Seung C Sohn
(74) *Attorney, Agent, or Firm* — Fish & Richardson P.C.

(57) ABSTRACT

Systems and techniques relating to automatically-locked homodyne detection are described. A described system includes a first nonlinear element, a filter, and second nonlinear elements. The first nonlinear element can produce, based on an input signal and a first continuous wave (CW) signal, a first output signal that includes the input signal and a phase conjugate copy of the input signal. The filter can produce a filtered signal based on the first output signal and can be programmable to adjust an induced delay between the input signal and the phase conjugate signal. The second nonlinear elements can produce second output signals based on a second CW signal and differently weighted combinations of signal components within the filtered signal. The second output signals can include an in-phase output signal based on an in-phase version of the filtered signal and a quadrature output signal based on a quadrature version of the filtered signal.

23 Claims, 11 Drawing Sheets

(58) Field of Classification Search
USPC .......................................................... 250/216
See application file for complete search history.

(56) References Cited

U.S. PATENT DOCUMENTS

| | | | |
|---|---|---|---|
| 2008/0212166 A1* | 9/2008 | Lett | G02F 1/3536 359/326 |
| 2010/0177297 A1* | 7/2010 | Guha | G01C 3/08 356/4.01 |

OTHER PUBLICATIONS

Chitgarha et al., "All-Optical Phase Noise Suppression Using Optical Nonlinear Mixing Combined with Tunable Optical Delays," in Optical Fiber Communication Conference/National Fiber Optic Engineers Conference 2013, OSA Technical Digest (online) (Optical Society of America, 2013), paper OW4C.5.

Fice, et al., "Homodyne Coherent Optical Receiver Using an Optical Injection Phase-Lock Loop," J. of Lightwave Technol., 29, 1152-1164 (2011).

Miyazaki, et al., "PSK Self-Homodyne Detection Using a Pilot carrier for Multibit/Symbol Transmission with Inverse-RZ Signal," Photon. Tech. Lett. 17, 1334-1336 (2005).

Nakamura et al., "Pilot-Carrier Based Linewidth-Tolerant 8PSK Self-homodyne using Only One Modulator," ECOC (2007).

Shinada et al., "16-QAM optical packet switching with real-time self-homodyne detection using polarization-multiplexed pilot-carrier" Optics Exp. 20, B535-B542 (2012).

Ziyadi et al., "Experimental Demonstration of Tunable and Automatically-Locked Homodyne Detection for Dual-Polarization 20-32-Gbaud QPSK Channels using Nonlinear Mixing and Polarization Diversity," in CLEO: 2015, OSA Technical Digest (online) (Optical Society of America, 2015), paper STh1O.5.

* cited by examiner

AUTOMATICALLY LOCKED HOMODYNE DETECTION

CROSS REFERENCE TO RELATED APPLICATION

This patent document claims the benefit of priority from U.S. provisional application No. 62/051,245 entitled "AUTOMATICALLY LOCKED HOMODYNE DETECTION" and filed on Sep. 16, 2014, which is incorporated herein by reference in its entirety.

STATEMENT AS TO FEDERALLY SPONSORED RESEARCH

This invention was made with government support under Grant No. 1202575 awarded by the National Science Foundation (NSF). The government has certain rights in the invention.

BACKGROUND

Conventional methods for homodyne detection include the intradyne method and a carrier method. In the intradyne method, digital signal processing may be required to recover and detect the signal due to variances between the local oscillator and the incoming data signal. The carrier method can include transmitting a carrier signal along with the data signal. In the carrier method, the carrier signal occupies some part of the spectrum and polarization state, and suffers from fiber loss and can accumulate phase noise.

Optical homodyne detection provides better performance and is more sensitive than optical heterodyne detection. However, homodyne-systems require that the local oscillator have the same frequency and phase as the incoming data signal, i.e., the data signal and local oscillator are equal and locked to each other.

A previous approach for carrier recovery includes transmitting a carrier signal along with the data signal. With this approach, the carrier: (a) occupies some part of the spectrum and polarization state, and (b) suffers from fiber loss and can accumulate phase noise. Another approach is to have a local laser oscillator in the receiver, where a phase locked loop (PLL) and signal processing algorithms ensure the locking of the local laser to the same frequency and phase. However, this tends to be fairly complex and requires time to lock. Additionally, some optical methods can recover the carrier of an incoming data signal using nonlinear processing, but these methods typically require an optical feedback loop for stabilization.

SUMMARY

The present disclosure includes systems and techniques relating to homodyne detection. A described system can include an interface to receive an input signal including an in-phase component and a quadrature component; a first pump laser to produce a first continuous wave signal; a first nonlinear element coupled with the interface and the first pump laser, the first nonlinear element configured to produce a first output signal based on the input signal and the first continuous wave signal, the first output signal including a phase conjugate signal, the input signal, and the first continuous wave signal, the phase conjugate signal being a phase conjugate version of the input signal that is produced within the first nonlinear element; a filter coupled with the first nonlinear element, the filter being configured to produce a filtered signal based on the first output signal, the filter being programmable to adjust signal phase and amplitude, the filter being programmable to adjust an induced delay between the input signal and the phase conjugate signal, the induced delay being based on a baud rate associated with the input signal; a second pump laser to produce a second continuous wave signal; second nonlinear elements coupled with the filter and the second pump laser, the second nonlinear elements being configured to produce second output signals based on the second continuous wave signal and differently weighted combinations of signal components within the filtered signal, wherein the second output signals include (i) an in-phase output signal based on an in-phase version of the filtered signal and (ii) a quadrature output signal based on a quadrature version of the filtered signal; and photodetectors coupled respectively with the second nonlinear elements, the photodetectors producing photocurrents respectively for the second output signals.

These and other implementations can include one or more of the following features. The filtered signal can include a filtered version of the input signal, a delayed filtered version of the phase conjugate signal that is based on the induced delay, and a filtered version of the first continuous wave signal. The second output signals can be based on differently weighted combinations of the filtered version of the first continuous wave signal and a product signal, the product signal being based on the filtered version of the input signal and the delayed filtered version of the phase conjugate signal. The photodetectors can include a first pair of balanced photodetectors coupled with the in-phase output signal, the in-phase output signal can include a positive in-phase version and a negative in-phase version; and a second pair of balanced photodetectors coupled with the quadrature output signal, the quadrature output signal can include a positive quadrature version and a negative quadrature version. Implementations can include a controller configured to adjust the induced delay based on a change in the baud rate. In some implementations, the filter is configured to compensate for a relative phase between the input signal and the continuous wave signal, and adjust one or more amplitude levels of one or more of the input signal, the phase conjugate signal, or the continuous wave signal. The filter can include a first port configured to produce the in-phase version of the filtered signal; and a second port configured to produce the quadrature version of the filtered signal. The second nonlinear elements can include a first waveguide coupled with the first port and configured to mix first signal components of the in-phase version of the filtered signal; and a second waveguide coupled with second port and configured to mix second signal components of the quadrature version of the filtered signal. The first nonlinear element can include a periodically poled lithium niobate waveguide. The second nonlinear elements can include one or more a periodically poled lithium niobate waveguides. In some implementations, a quasi phase matching (QPM) wavelength of each of the second nonlinear elements is temperature tuned to a QPM wavelength of the first nonlinear element. In some implementations, the baud rate is at least 20 Gbaud.

In another aspect, a detection system can include an interface to receive an input signal including an in-phase component and a quadrature component; a first pump laser to produce a first continuous wave signal; a first nonlinear element coupled with the interface and the first pump laser, the first nonlinear element configured to produce a nonlinear output signal based on the input signal and the first continuous wave signal, the nonlinear output signal including a phase conjugate signal, the input signal, and the first continuous wave signal, the phase conjugate signal being a phase conjugate version of the input signal that is produced within the first nonlinear element; a filter coupled with the first nonlinear element, the filter being configured to adjust an induced delay between the input signal and the phase conjugate signal, the induced delay being based on a baud rate associated with the input signal, the filter being configured to produce an in-phase filtered signal based on the nonlinear output signal and the induced delay, the filter being configured to produce a quadrature filtered signal based on the nonlinear output signal and the induced delay; a second pump laser to produce a second continuous wave signal; second nonlinear elements coupled with the filter and the second pump laser; and photodetectors coupled respectively with the second nonlinear elements. The second nonlinear elements can include a first waveguide in an in-phase pathway to produce an in-phase output signal based on differently weighted combinations of signal components within the in-phase filtered signal and (ii) and a second waveguide in a quadrature pathway to produce a quadrature output signal based on differently weighted combinations of signal components within the quadrature filtered signal.

These and other implementations can include one or more of the following features. The in-phase filtered signal and the quadrature filtered signal can each include a filtered version of the input signal, a delayed filtered version of the phase conjugate signal that is based on the induced delay, and a filtered version of the first continuous wave signal. The in-phase output signal and the quadrature output signal can each be based on differently weighted combinations of the filtered version of the first continuous wave signal and a product signal, the product signal being based on the filtered version of the input signal and the delayed filtered version of the phase conjugate signal. The photodetectors can include a first pair of balanced photodetectors coupled with the in-phase output signal, the in-phase output signal including a positive in-phase version and a negative in-phase version; and a second pair of balanced photodetectors coupled with the quadrature output signal, the quadrature output signal including a positive quadrature version and a negative quadrature version. Implementations can include a controller configured to adjust the induced delay based on a change in the baud rate. In some implementations, the first nonlinear element includes a periodically poled lithium niobate waveguide. In some implementations, a QPM wavelength of each of the second nonlinear elements is temperature tuned to a QPM wavelength of the first nonlinear element.

In another aspect, a detection method can include receiving an input signal comprising an in-phase component and a quadrature component; producing a first continuous wave signal and a second continuous wave signal; and operating a first nonlinear element to produce a first output signal based on the input signal and the first continuous wave signal, the first output signal including a phase conjugate signal, the input signal, and the first continuous wave signal, the phase conjugate signal being a phase conjugate version of the input signal that is produced within the first nonlinear element. The method can include operating a filter to produce a filtered signal based on the first output signal and an induced delay parameter, the filter being programmable to adjust an induced delay between the input signal and the phase conjugate signal based on the induced delay parameter, the induced delay being based on a baud rate associated with the input signal. The method can include operating second nonlinear elements to produce second output signals based on the second continuous wave signal and differently weighted combinations of signal components within the filtered signal. The second output signals can include an in-phase output signal based on an in-phase version of the filtered signal and a quadrature output signal based on a quadrature version of the filtered signal. The method can include measuring, within photodetectors, in-phase photocurrents and quadrature photocurrents based respectively on the in-phase output signal and the quadrature output signal to extract information from the input signal. The method can include adjusting the induced delay based on a change in the baud rate.

Implementations of the subject matter of the present disclosure can result in one or more of the following advantages. A described technology can enable optical homodyne detection for which the detector is automatically "locked" in frequency and phase to the incoming data signal without the need for feedback or phase/frequency tracking. Moreover, in conventional detection schemes that may require digital signal processing to implement such feedback or tracking for locking purposes, a described technology does not require such digital signal processing for these purposes; however digital signal processing can be used elsewhere within the detector. A carrier signal need not be transmitted through the optical link. A described technology can increase receiver sensitivity. A described technology can decrease a bit-error-rate (BER). In some implementations, multiple data channels can be detected at the same time. Moreover, one or more implementations of the described technology can replace current coherent receivers to result in reduced cost, reduced complexity, or both.

DETAILED DESCRIPTION

An optical receiver can perform homodyne detection using nonlinear optical signal processing to automatically lock a "local" pump laser to an input signal such as a 20-to-40 Gbaud quadrature-phase-shift-keyed (QPSK) data signal. A described automatically locked optical receiver is not required to lock its pump laser to the input signal, use a transmission carrier signal, or include a locking mechanism such as phase and frequency tracking or a feedback loop to recover and detect the input signal. Rather, the automatically locked optical receiver can use a conjugate copy of the input signal to coherently add the input signal and a local oscillator signal, e.g., local pump laser signal, with appropriate complex weights to detect and extract data from the input signal. After tuning the local pump laser to a known expected wavelength, the automatically locked optical receiver is not required to further alter the local pump laser in order to detect and process the incoming single.

Figure 1:
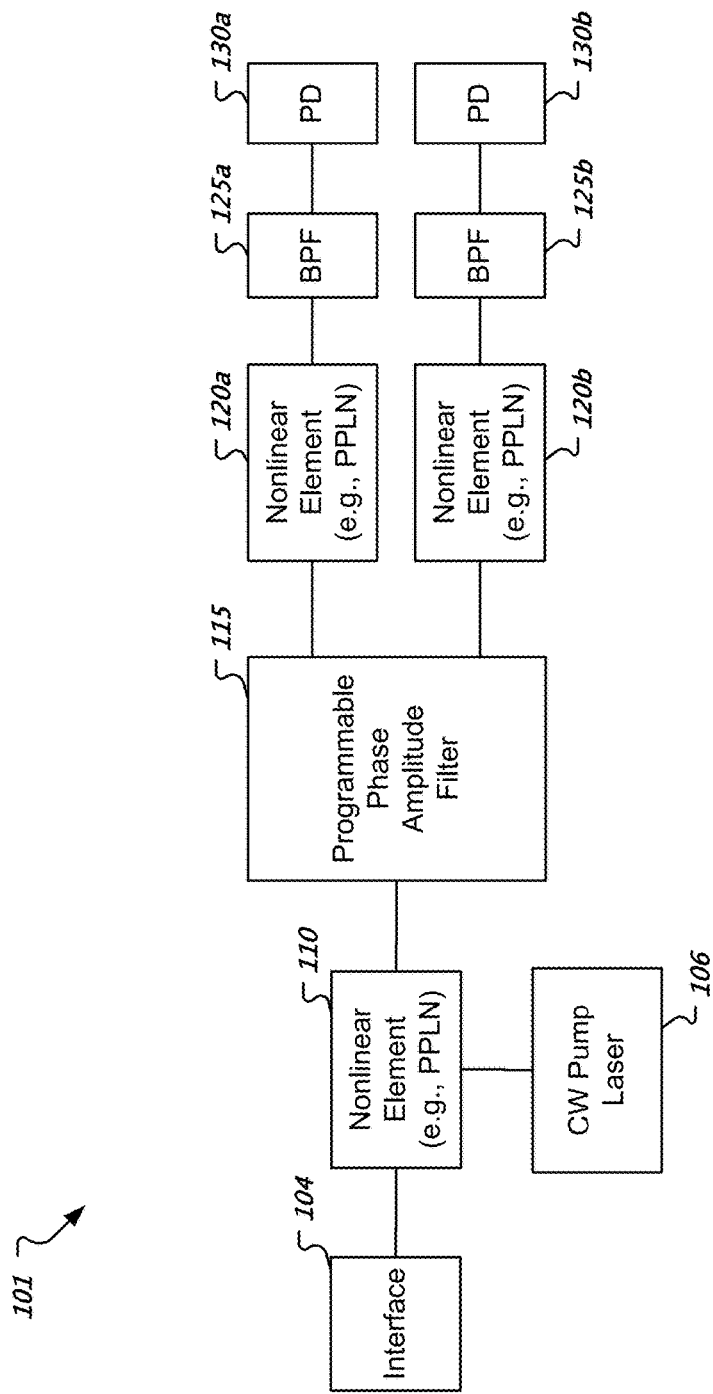
FIG. 1 shows a high-level architecture of an example of an automatically locked homodyne detector within a receiver.

FIG. 1 shows a high-level architecture of an example of an automatically locked homodyne detector within a receiver 101. The receiver 101 includes an interface 104, continuous wave (CW) pump laser 106, first nonlinear element 110, programmable phase and amplitude filter 115, second nonlinear elements 120a, 120b, band pass filters (BPFs) 125a, 125b, and photodetectors (PDs) 130a, 130b. The interface 104 can receive an input signal that is QPSK modulated. However, other types of modulation are possible such as binary phase shift keying (BPSK) and M-ary phase shift keying.

The input signal along with a CW signal produced by the CW pump laser 106 are injected into the first nonlinear element 110. A combiner such as an optical coupler or a beam splitter can combine the input signal and the CW signal before injection into the first nonlinear element 110. The first nonlinear element 110 can include a waveguide such as a periodically-poled-lithium-niobate (PPLN) waveguide or, in general, a waveguide with a second order susceptibility. The first nonlinear element 110 can produce a phase conjugate copy of the input signal.

The input signal and its conjugate copy are then sent into a programmable phase and amplitude filter 115. The filter 115 can induce a one symbol delay between the input signal and its conjugate copy. Further, the filter 115 can compensate for the relative phase between the CW signal from pump laser 106 and the input signal. In addition, the filter 115 can adjust the amplitude levels of the signals. The filter 115 can produce in-phase and quadrature versions of its filtered signal which are respectively provided to the second nonlinear elements 120a, 120b. Another CW pump laser (not shown) can provide a signal to drive the second nonlinear elements 120a, 120b. In some implementations, the filter 115 can cause the original offset phase of the input signal and the CW signal to become zero. In some implementations, the filter 115 can cause the relative phase of the input signal and the CW signal to become in-phase for an in-phase filter port and to become quadrature phase for a quadrature filter port.

The original input signal can be denoted by S(t). The injected CW signal can be denoted by E. Based on the induced delay created by the filter 115, the conjugate copy at the output of the filter 115 is $S^*(t-T_s)$ where $T_s$ represents a one symbol period. The output signal of the filter 115, which includes the filtered versions of the original signal, the conjugate copy signal, and the CW signal, are sent to second nonlinear elements 120a, 120b to create different mixing products of the input signal and the conjugate copy combined with the CW signal using a group of weights (e.g., $A\epsilon\{\pm 1,\pm j\}$). These mixing products can be denoted as $S_{max}(t)=E^2+AX(t)$ where $X(t)=S(t)\times S^*(t-T_s)$, $X(t)=S(t)\times S^*(t-T_s)$, and $A\epsilon\{\pm 1,\pm j\}$.

In this example, a second nonlinear element 120a handles the in-phase mixing products associated with $A_i\epsilon\{\pm 1\}$ and another second nonlinear element 120b handles the quadrature mixing products associated with $A_q\epsilon\{\pm j\}$. In respective in-phase and quadrature pathways, the second nonlinear elements 120a, 120b can be coupled with photodetectors 130a, 130b via BPFs 125a, 125b. By sending the outputs of the second nonlinear elements 120a, 120b to the photodetectors 130a, 130b, respectively, and setting A to $\pm 1$ or $\pm j$, similar to a 90° optical hybrid, both in-phase and quadrature components of X(t) can be obtained. The receiver 101 can measure the photocurrent associated with the in-phase pathway via photodetector 130a, e.g., it measures $i_I(t)\sim|E^2\pm X(t)|^2$. The receiver 101 can measure the photocurrent associated with the quadrature pathway via photodetector 130b, e.g., it measures $i_Q(t)\sim|E^2\pm jX(t)^2|$. In some implementations, the receiver 101 can simultaneously generate the constructive and destructive multiplexing signals of the input signal and the CW signal and provide them to balanced photodetectors such as a pair of balanced photodiodes to realize a 3-dB improvement for both I and Q components of the input signal.

Figure 2A:
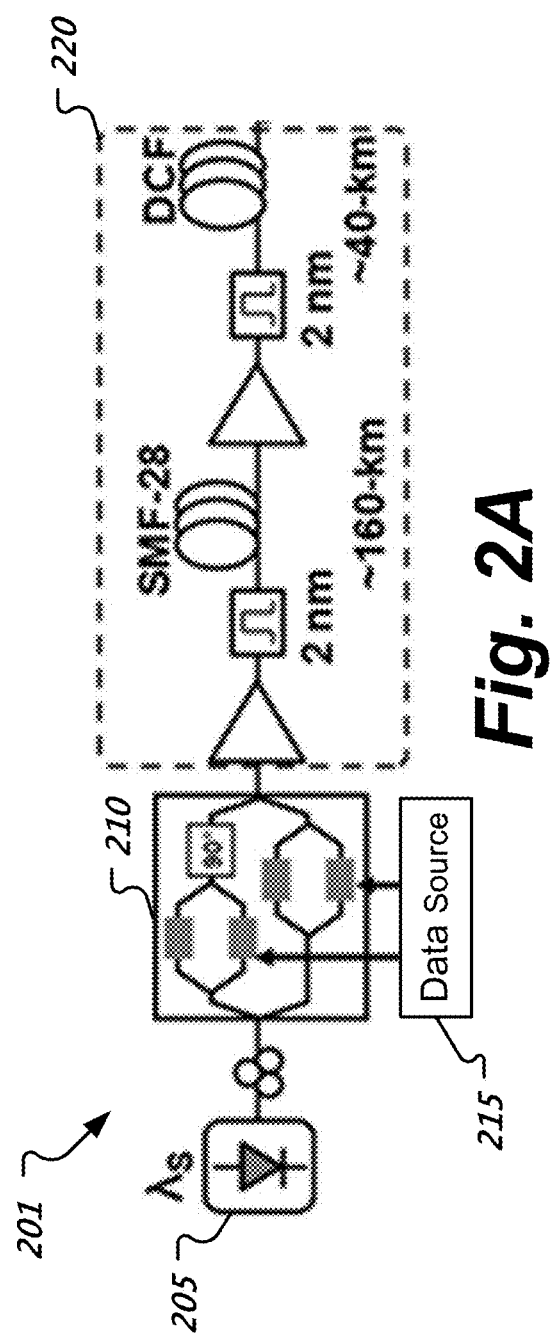
FIGS. 2A and 2B collectively show an architecture of an optical communication system that includes a receiver with an automatically locked homodyne detector.
Figure 2B:
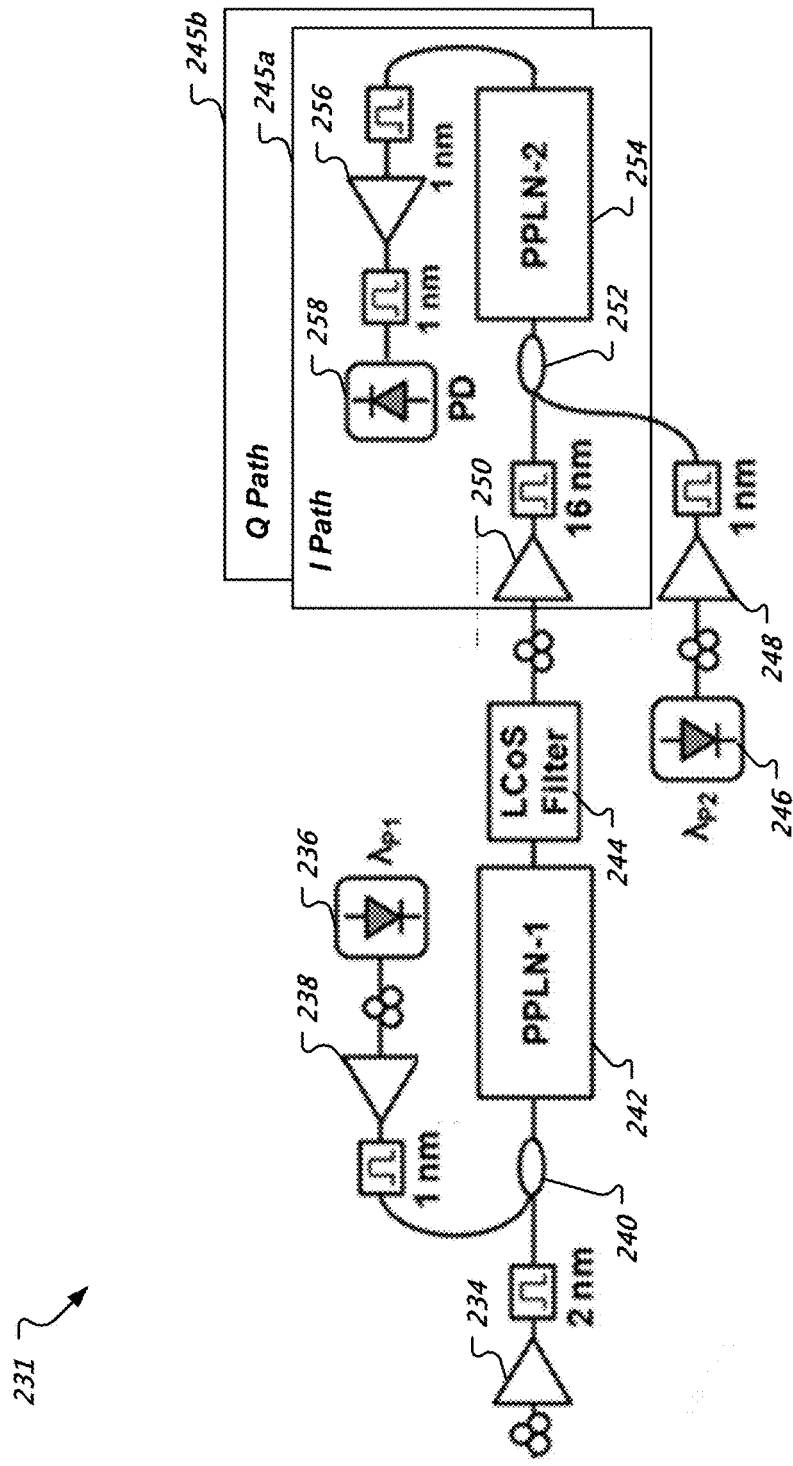

FIGS. 2A, 2B, 2C, 2D, 2E, and 2F collectively show an architecture of an optical communication system that includes a receiver with an automatically locked homodyne detector and associated signal spectra graphs for different outputs within the receiver. FIGS. 2A and 2B show an architecture of an optical communication system that includes a transmitter 201, transmission link 220, and a receiver 231. FIGS. 2C, 2D, 2E, and 2F show signal outputs of various components within the receiver 231.

In FIG. 2A, the transmitter 201 includes a light source 205, data source 215, and a modulator 210. The transmitter 201 can produce a transmission signal via the modulator 210 that is QPSK modulated with an associated baud rate of at least 20 Gbaud, other baud rates are possible such as 25 or 40 Gbaud. The light source 205 products a beam having a wavelength $\lambda_s$ which can be 1555 nm or 1554.1 nm. Other wavelengths are possible. In a test setup, the transmitter 201 can use a nested Mach-Zehnder modulator with a pseudo-random bit sequence (PRBS) of $2^{31}-1$ to produce the transmission signal. The transmission link 220 can include one or more amplifiers, one or more filters such as BPFs, and one or more types of fiber optic cables such as single-mode optical fiber (SMF) or dispersion-compensating fiber (DCF). In this example, the transmission link 220 includes 200 km of fiber with 160 km worth of SMF and 40 km of DCF.

The receiver 231 receives an input signal from the transmission link 220. The receiver 231 amplifies the input signal with an amplifier 234. A CW pump laser 236 produces a primary CW signal which is amplified via amplifier 238. In this example, the primary CW signal has a wavelength $\lambda_{P1}$ of ~1550.6 nm. A coupler 240 combines the amplified CW signal and the amplified input signal. The output of the coupler 240 is sent to a first PPLN waveguide 242 (PPLN-1) to produce a phase conjugate version of the input signal. The quasi phase matching (QPM) of the first PPLN waveguide 242 can be set to the wavelength $\lambda_{P1}$ of the CW pump laser 236.

The output of the first PPLN waveguide 242 is sent to a filter 244. In this example, the filter 224 is programmable and includes liquid crystal on silicon (LCoS) technology for adjusting the delay, phase, and the complex weights. The filtered signal, which includes filtered versions of the input signal, the conjugate copy, and the primary CW signal pump, is amplified by amplifier 250. The filter 244 can be configured to generate a delayed version of the conjugate copy of the input signal, e.g., $S^*(t-T_s)$ where $T_s$ is the induced delay. The receiver 231 can be reconfigured to handle a new baud rate by changing the induced delay between the input signal and its conjugate copy in the filter 244. Because the local oscillator, e.g., primary CW signal, is automatically "locked" in frequency and phase to the incoming data signal the receiver 231 does not require phase and frequency recovery. In some implementations, a LCoS filter can include a miniaturized reflective active-matrix liquid-crystal display or "microdisplay" using a liquid crystal layer on top of a silicon backplane; it can be referred to as a spatial light modulator. In some implementations, a LCoS filter can include a complementary metal-oxide semiconductor (CMOS) chip that controls the voltage on square reflective aluminum electrodes buried just below the chip's surface, each controlling one plate. A common voltage for all the plates can be supplied by a transparent conductive layer made of indium tin oxide on the cover glass. A LCoS filter can implement wavelength selective switching (WSS). The ability of an LCoS-based WSS filter to independently control both the amplitude and phase of a transmitted signal leads to the ability to manipulate the amplitude and/or phase of an optical pulse through a process known as Fourier-domain pulse shaping.

The filter 244 can provide a filtered signal to an in-phase pathway 245a and to a quadrature pathway 245b. In some implementations, the filter 244 provides an in-phase version a quadrature version of the filtered signal to the in-phase pathway 245a and quadrature pathway 245b via respective filter ports. Note that the internal components of the quadrature pathway 245b mirrors the components of the in-phase pathway 245a and are not depicted in FIG. 2B to simplify the figure.

Another CW pump laser 246 produces a secondary CW signal which is amplified by amplifier 248 and provided to both of the pathways 245a, 245b. In this example, the secondary CW signal has a wavelength $\lambda_{P2}$ of 1560 nm. In the in-phase pathway 245a, a coupler 252 combines the amplified filtered signal from amplifier 250 and the amplified secondary CW signal from amplifier 248. The output of the coupler 252 is sent to a second PPLN waveguide 254 (PPLN-2) to perform mixing between the input signal and the conjugate copy and multiplexing them with the primary CW signal. The QPM wavelength of the second PPLN waveguide 254 is temperature tuned to the QPM wavelength of the first PPLN waveguide 242. The multiplexed signal is then filtered, amplified via amplifier 256, and sent to a photodetector 258 to capture an eye diagram and perform a bit-error measurement for the in-phase pathway 245a. A photodetector 258 can include one or more photodiodes. The operations of the quadrature pathway 245b are similar to the in-phase pathway 245b, except that the quadrature pathway 245b handles the quadrature version of the filtered signal produced by filter 244. Each of the amplifiers in FIG. 2B can be coupled with a band pass filter to filter amplifier output. The wavelength characteristic of one or more of the band pass filters, such as the filter associated with amplifier 256, can be matched with the wavelength of the generated signal in the second PPLN waveguide 254.

Figure 2C:
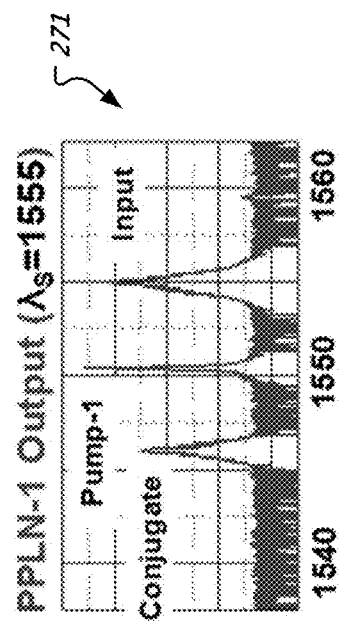
FIGS. 2C, 2D, 2E, and 2F associated signal spectra graphs for different outputs within the receiver of FIG. 2B.
Figure 2D:
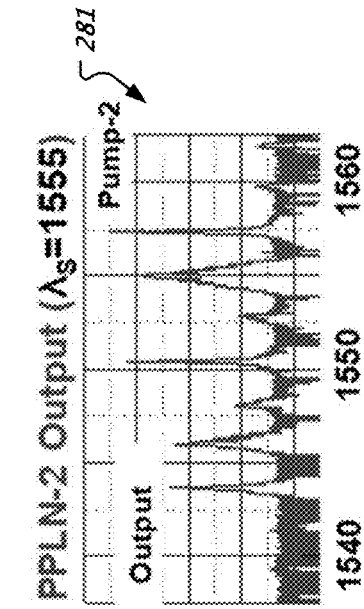

FIGS. 2C, 2D, 2E, and 2F show signal output spectra of the first and second PPLN waveguides within the receiver 231. The graph 251 in FIG. 2C shows the output of the first PPLN waveguide 242 for a source wavelength $\lambda_s$ of 1554.1 nm. The graph 251 depicts spectral peaks associated with the input signal, the primary CW signal (labelled Pump-1), and the conjugate copy. The graph 261 in FIG. 2D shows the output of the second PPLN waveguide 254 in the in-phase pathway 245a given the output of the first PPLN waveguide 242 as depicted in graph 251. The graph 261 depicts spectral peaks associated with the input signal, primary CW signal, second CW signal (labelled Pump-2), the conjugate copy, and the multiplexed signal (labelled Output). As can be seen, the multiplexed signal shown in graph 261 is always in frequency and phase lock with respect to the generated carrier.

Figure 2E:
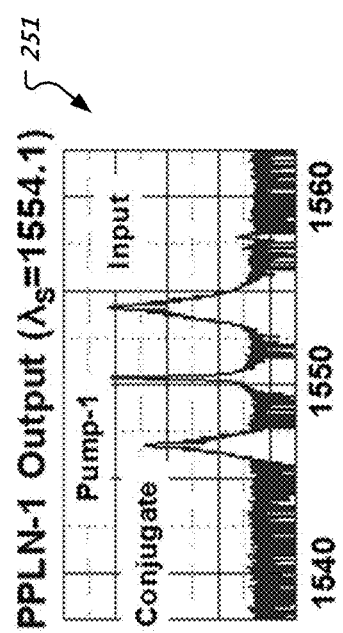
Figure 2F:
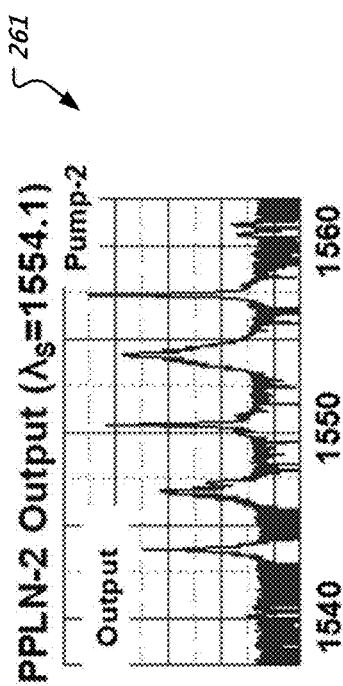

The graph 271 in FIG. 2E shows the output of the first PPLN waveguide 242 for a different source wavelength $\lambda_s$ of 1555 nm. The graph 281 in FIG. 2F shows the output of the second PPLN waveguide 254 in the in-phase pathway 245a given the output of the first PPLN waveguide 242 as depicted in graph 271. As can be seen, the multiplexed signal shown in graph 281 is always in frequency and phase lock with respect to the generated carrier.

Figure 3A:
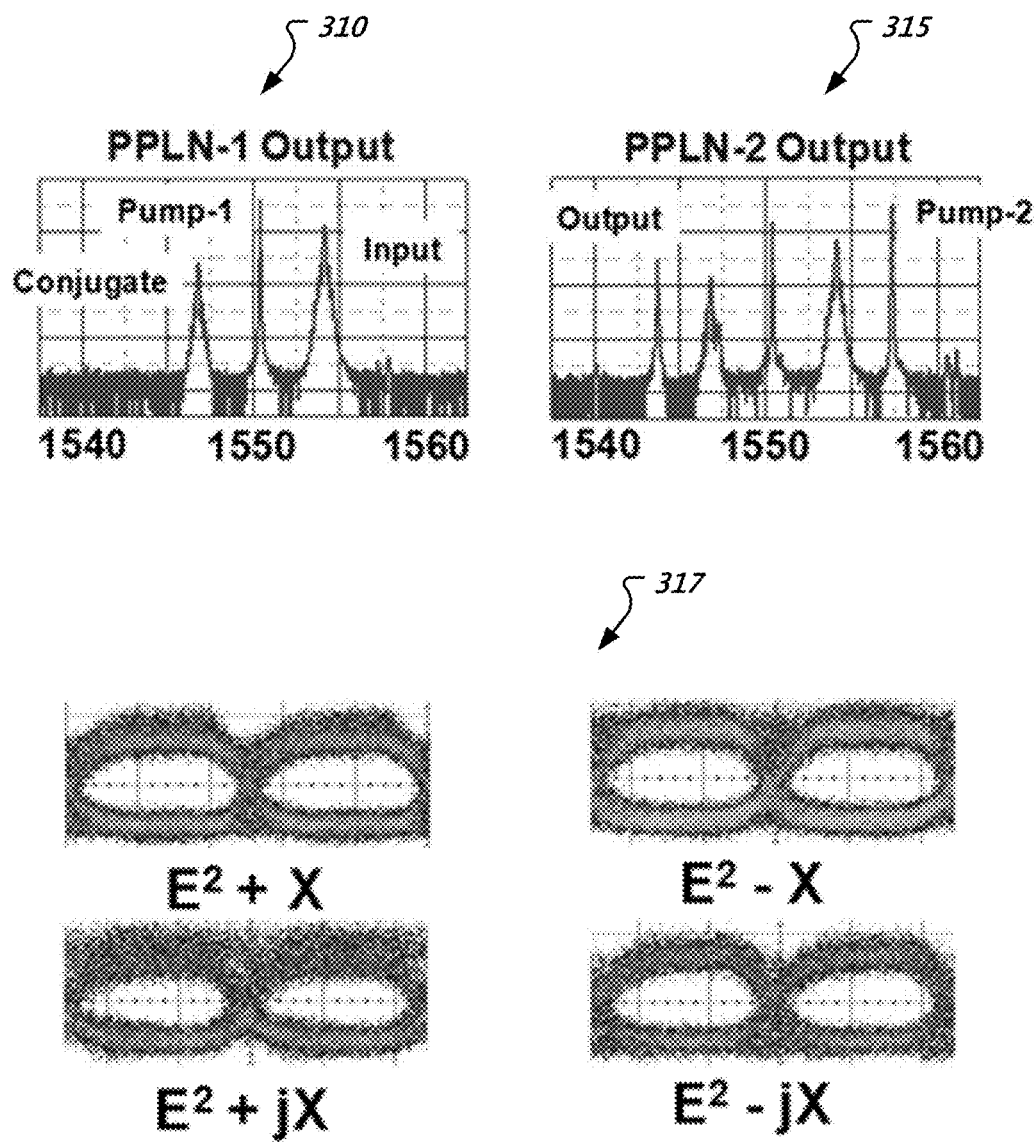
FIGS. 3A, 3B, and 3C show optical spectra outputs of the waveguides within the receiver of FIG. 2B and associated eye diagrams for 20 Gbaud, 25 Gbaud, and 40 Gbaud QPSK signals.
Figure 3B:
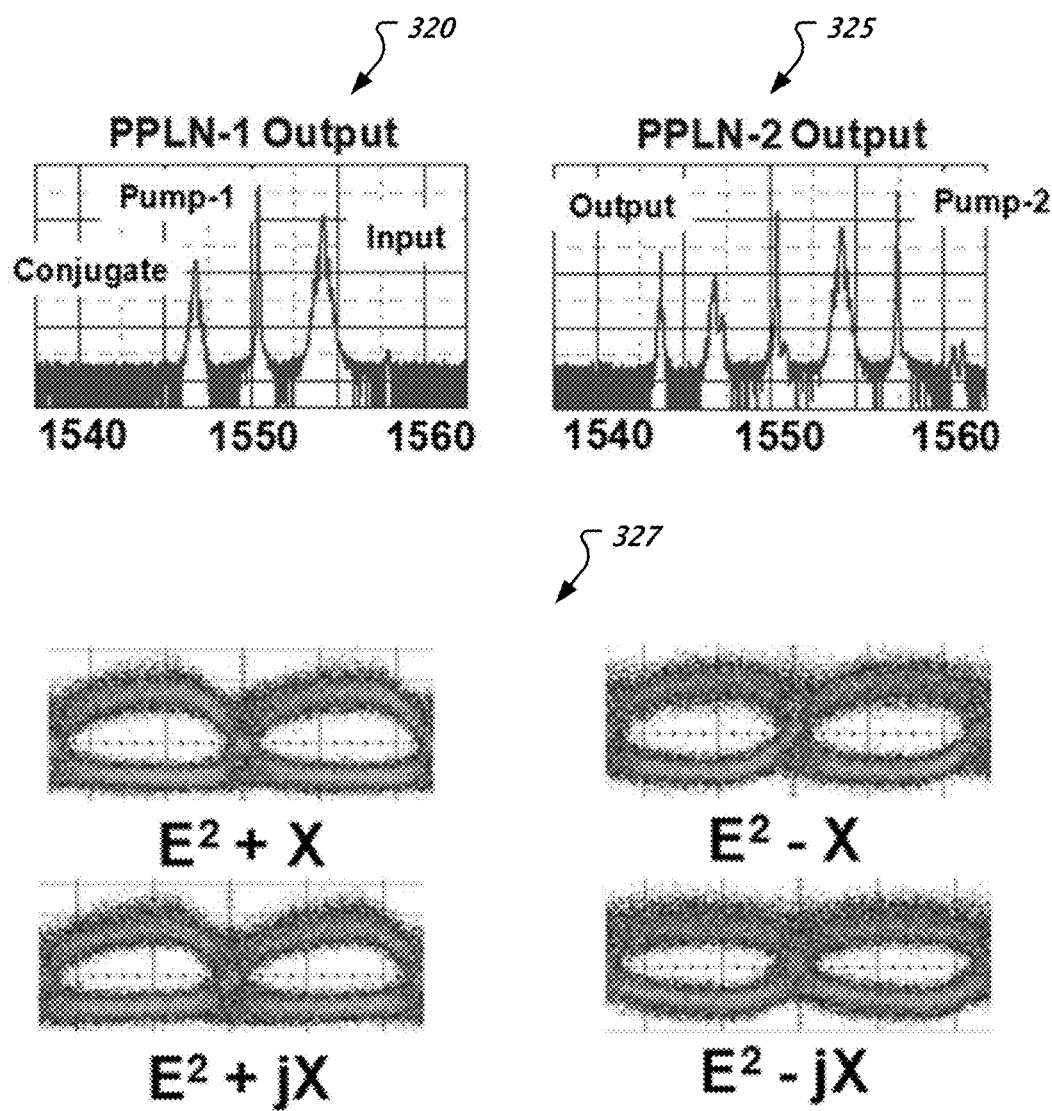
Figure 3C:
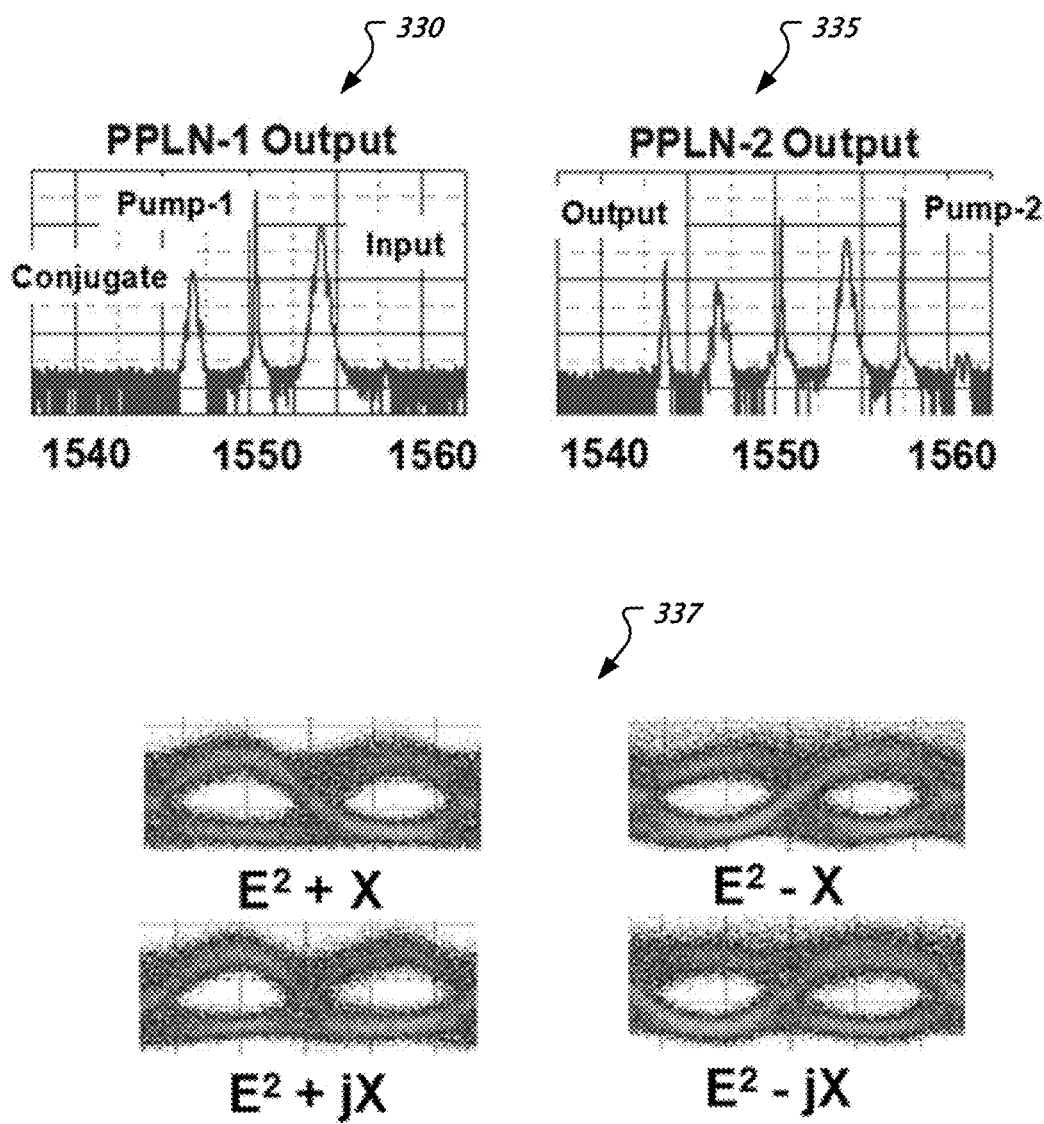

FIGS. 3A, 3B, and 3C show optical spectra outputs of the waveguides within the receiver of FIG. 2B and associated eye diagrams for 20 Gbaud, 25 Gbaud, and 40 Gbaud QPSK signals. In FIG. 3A, the spectra of the first and second PPLN waveguides 242, 254 are shown for a 20 Gbaud QPSK data input signal in graphs 310, 315 respectively. In order to show the performance of the receiver in creating all four possible combinations of the local oscillator, e.g., primary CW signal, and the incoming data signal are generated and sent to a photodetector 258 in the receiver 231. The combinations include a positive in-phase combination $E^2+X(t)$, a negative in-phase combination $E^2-X(t)$, a positive quadrature combination $E^2+jX(t)$, and a negative quadrature combination $E^2-jX(t)$. In some implementations, the photodetector 258 can include a photodiode for each of the combinations for balanced detection. The resultant open eye diagrams 317 for all of the combinations are shown in FIG. 3A. In FIG. 3B, the spectra of the first and second PPLN waveguides 242, 254 are shown for a 25 Gbaud QPSK data input signal in graphs 320, 325 respectively along with the resultant open eye diagrams 327. In FIG. 3C, the spectra of the first and second PPLN waveguides 242, 254 are shown for a 40 Gbaud QPSK data input signal in graphs 330, 335 respectively along with the resultant open eye diagrams 337. As can be seen, the receiver 231 shows significant sensitivity and is data rate transparent.

Figure 4A:
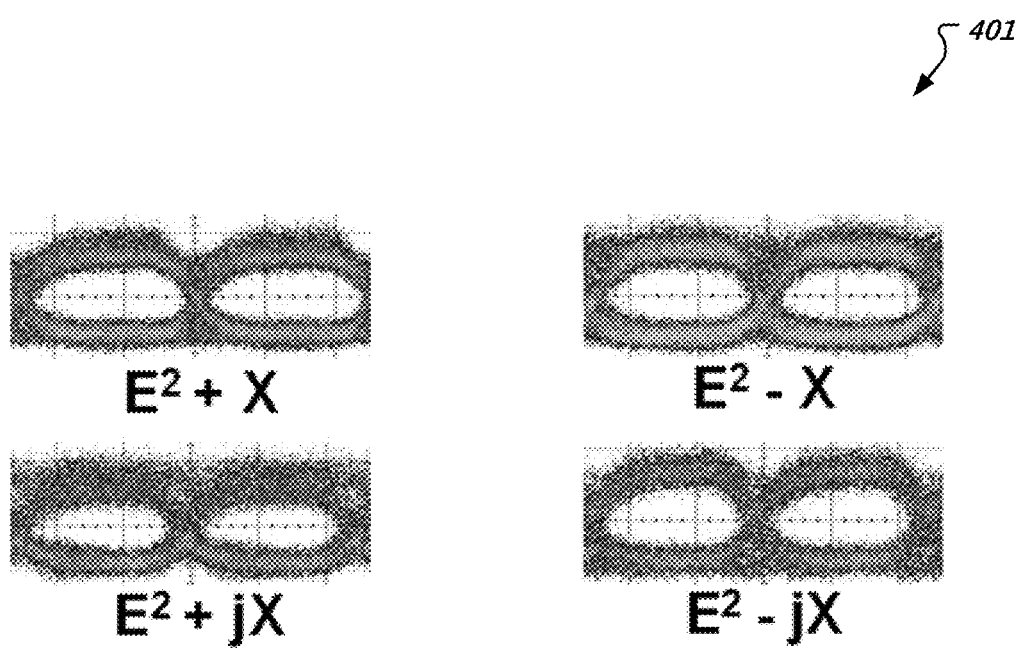
FIG. 4A shows eye diagrams 401 for a 20 Gbaud QPSK signal detection using the receiver of FIG. 2B after a 200 km transmission from the transmitter of FIG. 2A.
Figure 4B:
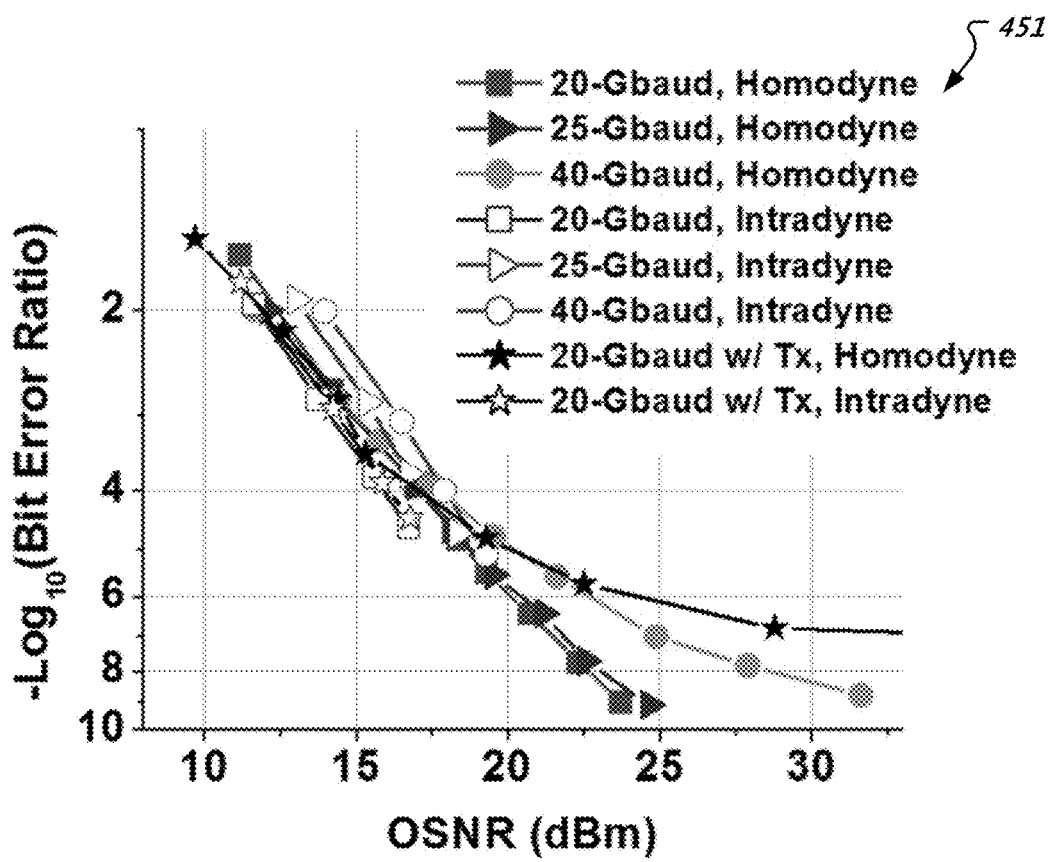
FIG. 4B shows the BER performance of the homodyne detection scheme of the receiver 231 of FIG. 2B and compares it with a conventional intradyne detection scheme.

FIG. 4A shows eye diagrams 401 for a 20 Gbaud QPSK signal detection using the receiver of FIG. 2B after a 200 km transmission from the transmitter of FIG. 2A. FIG. 4B shows the BER performance of the homodyne detection scheme of the receiver 231 of FIG. 2B and compares it with a conventional intradyne detection scheme. Note that in the homodyne detection scheme of the receiver 231 of FIG. 2B, the BER measurement can be performed in real-time and the BER curves are obtained up to $\sim 1 \times 10^{-9}$. However, a conventional intradyne detection scheme may require offline processing to measure the BER and may be limited to $\sim 1 \times 10^{-5}$ BER. The graph 451 in FIG. 4B show BER performance curves for 20 Gbaud, 25 Gbaud, and 40 Gbaud QPSK signals for automatically locked homodyne detection and also for conventional intradyne detection. Note that the performance of the homodyne detection scheme of the receiver 231 can be increased by using a balanced detection method. Even without using a balanced detection method, the present homodyne detection scheme shows similar performance at 25 and 40-Gbaud to the intradyne with a phase and frequency recovery mechanism. Moreover, using the balanced detection method with the present homodyne detection scheme can, in some implementations, improve performance further. Additionally, the graph 451 in FIG. 4B shows a BER performance curve (labelled "20-Gbaud w/TX, Homodyne") for a 20 Gbaud QPSK signal after a 200 km transmission from the transmitter of FIG. 2A to the receiver 231 of the FIG. 2B.

Figure 5:
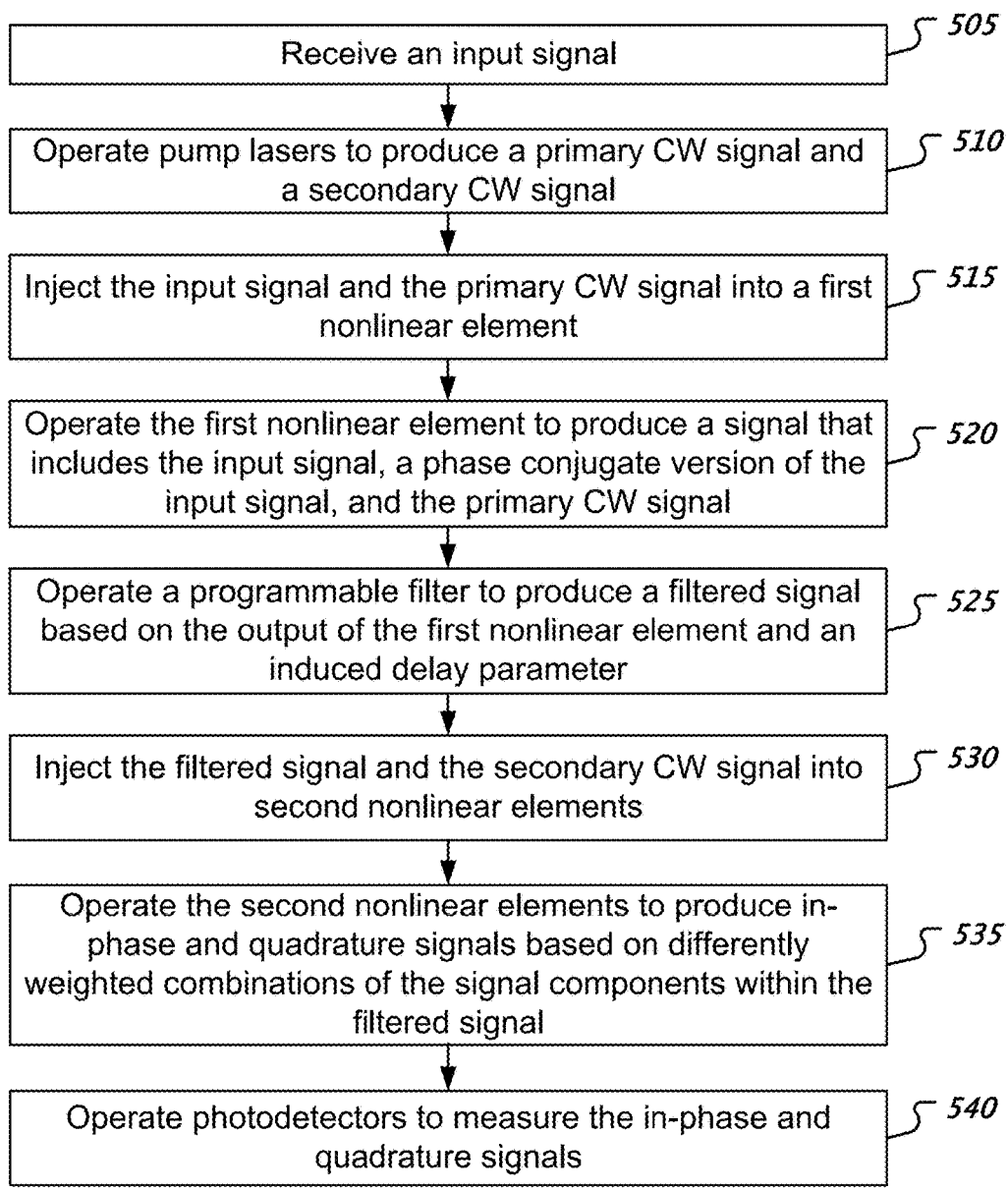
FIG. 5 shows a flowchart of an example of a homodyne detection process in a receiver.

FIG. 5 shows a flowchart of an example of a homodyne detection process in a receiver. At 505, the process receives an input signal. The input signal can include an in-phase component and a quadrature component. At 510, the process operates pump lasers to produce a primary CW signal and a secondary CW signal. The process can include setting the wavelengths of the pump lasers based on an expected wavelength of the input signal. At 515, the process injects the input signal and the primary CW signal into a first nonlinear element. Injecting the signals can include combining the signals using an optical coupler and providing an output of the coupler to the first nonlinear element. At 520, the process operates the first nonlinear element to produce a signal that includes the input signal, a phase conjugate version of the input signal, and the primary CW signal.

At 525, the process operates a programmable filter to produce a filtered signal based on the output of the first nonlinear element and an induced delay parameter. The filter can be programmed via the induced delay parameter to adjust an induced delay between the input signal and the phase conjugate signal. The induced delay can be based on a baud rate associated with the input signal. In some implementations, the filter includes an in-phase output port that produces an in-phase version of the filtered signal and a quadrature output port that produces a quadrature version of the filtered signal.

At 530, the process injects the filtered signal and the secondary CW signal into second nonlinear elements. At 535, the process operates the second nonlinear elements to produce in-phase and quadrature signals based on differently weighted combinations of the signal components within the filtered signal. The second nonlinear elements can be partitioned into an in-phase pathway and a quadrature pathway. The in-phase pathway can be coupled with an in-phase output port of the filter. The quadrature pathway can be coupled with a quadrature output port of the filter.

At 540, the process operates photodetectors to measure the in-phase and quadrature signals. In some implementations, the process operates a photodetector to measure the photocurrent of the in-phase pathway and operates another photodetector to measure the photocurrent of the quadrature pathway. The process can extract data bits from the input signal based on the outputs of the photodetectors.

Figure 6:
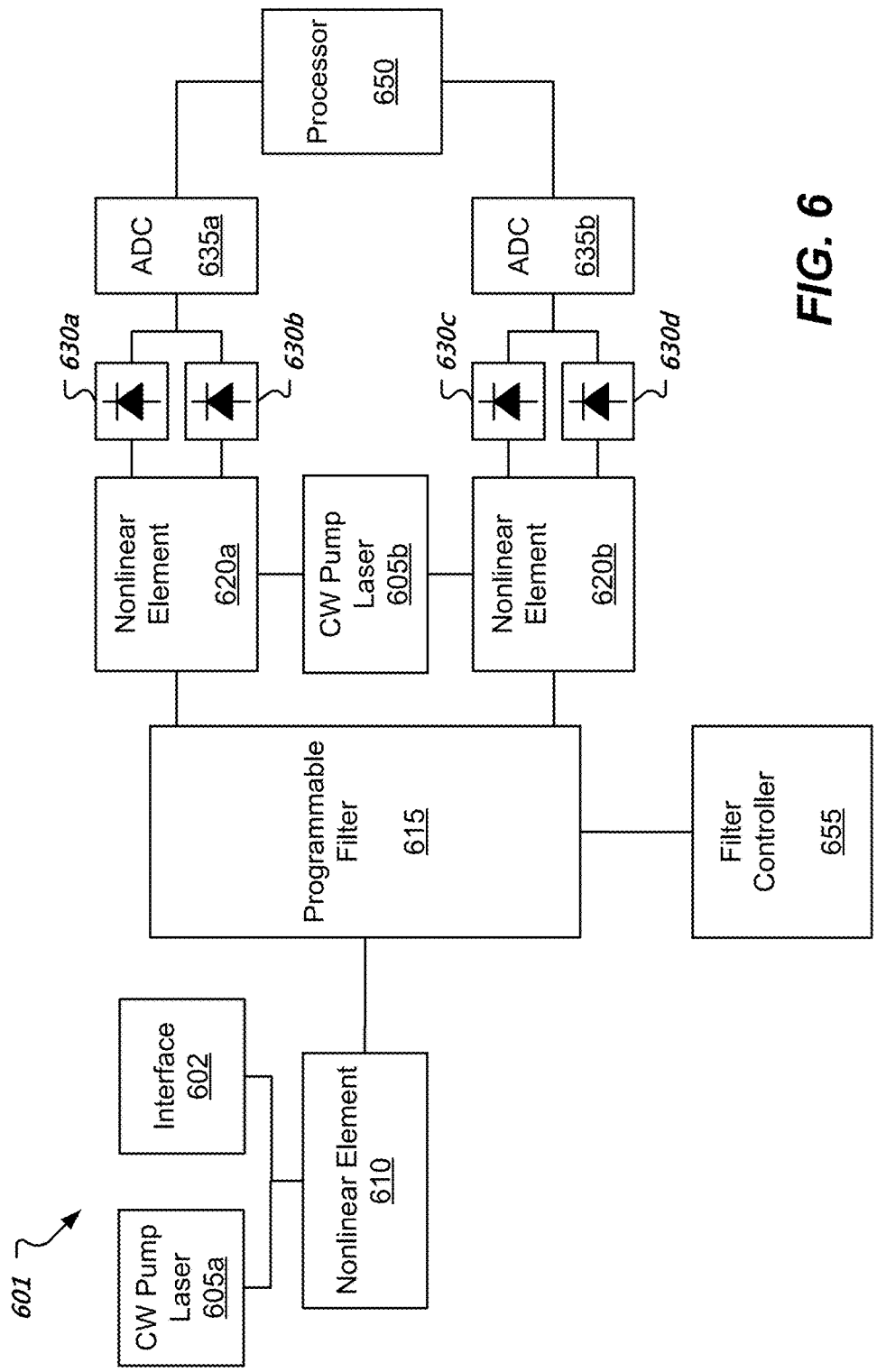
FIG. 6 shows a high-level architecture of an example of a balanced automatically locked homodyne detector within a receiver.

FIG. 6 shows a high-level architecture of an example of a balanced automatically locked homodyne detector within a receiver 601. The receiver 601 includes an interface 602 for receiving an input signal; CW pump lasers 605a, 605b; first nonlinear element 610 coupled with the interface 602 and CW pump laser 605a; programmable filter 615; second nonlinear elements 620a, 620b; photodiodes 630a, 630b, 630c, 630d; analog-to-digital converters (ADCs) 635a, 635b; processor 650; and filter controller 655.

The first nonlinear element 610 produces a conjugate copy of the input signal, i.e., a phase conjugate signal. The first nonlinear element 610 outputs a signal that includes a primary CW signal produced by CW pump laser 605a, the input signal, and the conjugate copy. The programmable filter 615 can compensate for a relative phase between the input signal and the primary CW signal. The programmable filter 615 can adjust one or more amplitude levels of one or more of the input signal, the phase conjugate signal, or the primary CW signal. The programmable filter 615 can induce a delay between the input signal and the phase conjugate signal. A filter controller 655 can provide an induced delay parameter to the programmable filter 615 to control an induced delay between the input signal and the phase conjugate signal. In some implementations, the filter controller 655 can determine the induced delay parameter based a baud rate associated with the input signal.

The in-phase second nonlinear element 620a for an in-phase pathway mixes signal components within an in-phase output of the programmable filter 615. A secondary CW signal produced by CW pump laser 605b is injected into the in-phase second nonlinear element 620a together with the in-phase output of the filter 615. The in-phase second nonlinear element 620a produces positive and negative in-phase outputs (e.g., $E^2+X(t)$ and $E^2-X(t)$) that are coupled with respective photodiodes 630a, 630b. The photocurrents produced by photodiodes 630a, 630b are combined and provided to an ADC 635a.

The quadrature second nonlinear element 620b for a quadrature pathway mixes signal components within a quadrature output of the programmable filter 615. The secondary CW signal produced by CW pump laser 605b is additionally injected into the quadrature second nonlinear element 620b together with the quadrature output of the filter 615. The quadrature second nonlinear element 620b produces positive and negative quadrature outputs (e.g., $E^2+jX(t)$, and $E^2-jX(t)$) that are coupled with respective photodiodes 630c, 630d. The photocurrents produced by photodiodes 630c, 630d are combined and provided to an ADC 635b.

The processor 650 can extract data bits from the input signal based on the outputs of the ADCs 635a, 635b. In some implementations, the processor 650 is configured to detect a baud rate of the incoming signal and provide the detected baud rate to the filter controller 655. In some implementations, the processor 650 is configured to tune the CW pump lasers 605a, 605b based on an expected wavelength of the input signal. In some implementations, the processor 650 can include the filter controller 655. In some implementations, the processor 650 include can include a digital signal processor (DSP).

The homodyne detectors described herein can be extended to dual polarized signals to support polarization multiplexed systems. This extension is described in the paper by M. Ziyadi et al., "Experimental Demonstration of Tunable and Automatically-Locked Homodyne Detection for Dual-Polarization 20-32-Gbaud QPSK Channels using Nonlinear Mixing and Polarization Diversity," in CLEO: 2015, OSA Technical Digest (online) (Optical Society of America, 2015), paper STh1O.5, which is incorporated herein by reference in its entity. A receiver can generate a signal conjugate in a nonlinear element inside a polarization diversity loop structure, and the input signal can be automatically phase/frequency locked to a local oscillator in another stage of the receiver.

The homodyne detectors described herein can be extended to tolerate an incoming signal modulated on commercial lasers with phase noise. This extension is described in the paper by A. Mohajerin Ariaei et al., "Experimental Demonstration of Simultaneous Phase Noise Suppression and Automatically Locked Tunable Homodyne Reception for a 20-Gbaud QPSK Signal," in CLEO: 2015, OSA Technical Digest (online) (Optical Society of America, 2015), paper SW1M.5, which is incorporated herein by reference in its entity. Here, the nonlinear elements responsible for mixing the components of the filter output can include a phase noise filter.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Other embodiments fall within the scope of the following claims.

What is claimed is:

1. An apparatus comprising:
an interface to receive an input signal comprising an in-phase component and a quadrature component;
a first pump laser to produce a first continuous wave signal;
a first nonlinear element coupled with the interface and the first pump laser, the first nonlinear element configured to produce a first output signal based on the input signal and the first continuous wave signal, the first output signal comprising a phase conjugate signal, the input signal, and the first continuous wave signal, the phase conjugate signal being a phase conjugate version of the input signal that is produced within the first nonlinear element;
a filter coupled with the first nonlinear element, the filter being configured to produce a filtered signal based on the first output signal, the filter being programmable to adjust signal phase and amplitude, the filter being programmable to adjust an induced delay between the input signal and the phase conjugate signal, the induced delay being based on a baud rate associated with the input signal;
a second pump laser to produce a second continuous wave signal;
second nonlinear elements coupled with the filter and the second pump laser, the second nonlinear elements being configured to produce second output signals based on the second continuous wave signal and differently weighted combinations of signal components within the filtered signal, wherein the second output signals comprise (i) an in-phase output signal based on an in-phase version of the filtered signal and (ii) a quadrature output signal based on a quadrature version of the filtered signal; and
photodetectors coupled respectively with the second nonlinear elements, the photodetectors producing photocurrents respectively for the second output signals.

2. The apparatus of claim 1, wherein the filtered signal comprises a filtered version of the input signal, a delayed filtered version of the phase conjugate signal that is based on the induced delay, and a filtered version of the first continuous wave signal, and
wherein the second output signals are based on differently weighted combinations of the filtered version of the first continuous wave signal and a product signal, the product signal being based on the filtered version of the input signal and the delayed filtered version of the phase conjugate signal.

3. The apparatus of claim 1, wherein the photodetectors comprise:
a first pair of balanced photodetectors coupled with the in-phase output signal, the in-phase output signal comprising a positive in-phase version and a negative in-phase version; and
a second pair of balanced photodetectors coupled with the quadrature output signal, the quadrature output signal comprising a positive quadrature version and a negative quadrature version.

4. The apparatus of claim 1, comprising:
a controller configured to adjust the induced delay based on a change in the baud rate.

5. The apparatus of claim 1, wherein the filter is configured to
compensate for a relative phase between the input signal and the continuous wave signal, and
adjust one or more amplitude levels of one or more of the input signal, the phase conjugate signal, or the continuous wave signal.

6. The apparatus of claim 1, wherein the filter comprises:
a first port configured to produce the in-phase version of the filtered signal; and
a second port configured to produce the quadrature version of the filtered signal.

7. The apparatus of claim 6, wherein the second nonlinear elements comprise
a first waveguide coupled with the first port and configured to mix first signal components of the in-phase version of the filtered signal; and
a second waveguide coupled with second port and configured to mix second signal components of the quadrature version of the filtered signal.

8. The apparatus of claim 1, wherein the first nonlinear element comprises a periodically poled lithium niobate waveguide.

9. The apparatus of claim 1, wherein a quasi phase matching (QPM) wavelength of each of the second nonlinear elements is temperature tuned to a QPM wavelength of the first nonlinear element.

10. The apparatus of claim 1, wherein the baud rate is at least 20 Gbaud.

11. A system comprising:
an interface to receive an input signal comprising an in-phase component and a quadrature component;
a first pump laser to produce a first continuous wave signal;
a first nonlinear element coupled with the interface and the first pump laser, the first nonlinear element configured to produce a nonlinear output signal based on the input signal and the first continuous wave signal, the nonlinear output signal comprising a phase conjugate signal, the input signal, and the first continuous wave signal, the phase conjugate signal being a phase conjugate version of the input signal that is produced within the first nonlinear element;
a filter coupled with the first nonlinear element, the filter being configured to adjust an induced delay between the input signal and the phase conjugate signal, the induced delay being based on a baud rate associated with the input signal, the filter being configured to produce an in-phase filtered signal based on the nonlinear output signal and the induced delay, the filter being configured to produce a quadrature filtered signal based on the nonlinear output signal and the induced delay;

a second pump laser to produce a second continuous wave signal;

second nonlinear elements coupled with the filter and the second pump laser, the second nonlinear elements comprising (i) a first waveguide in an in-phase pathway to produce an in-phase output signal based on differently weighted combinations of signal components within the in-phase filtered signal and (ii) and a second waveguide in a quadrature pathway to produce a quadrature output signal based on differently weighted combinations of signal components within the quadrature filtered signal; and photodetectors coupled respectively with the second nonlinear elements.

12. The system of claim 11, wherein the in-phase filtered signal and the quadrature filtered signal each comprise a filtered version of the input signal, a delayed filtered version of the phase conjugate signal that is based on the induced delay, and a filtered version of the first continuous wave signal, and wherein the in-phase output signal and the quadrature output signal are each based on differently weighted combinations of the filtered version of the first continuous wave signal and a product signal, the product signal being based on the filtered version of the input signal and the delayed filtered version of the phase conjugate signal.

13. The system of claim 11, wherein the photodetectors comprise:

a first pair of balanced photodetectors coupled with the in-phase output signal, the in-phase output signal comprising a positive in-phase version and a negative in-phase version; and a second pair of balanced photodetectors coupled with the quadrature output signal, the quadrature output signal comprising a positive quadrature version and a negative quadrature version.

14. The system of claim 11, comprising:
a controller configured to adjust the induced delay based on a change in the baud rate.

15. The system of claim 11, wherein the first nonlinear element comprises a periodically poled lithium niobate waveguide.

16. The system of claim 11, wherein a quasi phase matching (QPM) wavelength of each of the second nonlinear elements is temperature tuned to a QPM wavelength of the first nonlinear element.

17. A method comprising:
receiving an input signal comprising an in-phase component and a quadrature component;
producing a first continuous wave signal and a second continuous wave signal;
operating a first nonlinear element to produce a first output signal based on the input signal and the first continuous wave signal, the first output signal comprising a phase conjugate signal, the input signal, and the first continuous wave signal, the phase conjugate signal being a phase conjugate version of the input signal that is produced within the first nonlinear element;

operating a filter to produce a filtered signal based on the first output signal and an induced delay parameter, the filter being programmable to adjust an induced delay between the input signal and the phase conjugate signal based on the induced delay parameter, the induced delay being based on a baud rate associated with the input signal;

operating second nonlinear elements to produce second output signals based on the second continuous wave signal and differently weighted combinations of signal components within the filtered signal, wherein the second output signals comprise (i) an in-phase output signal based on an in-phase version of the filtered signal and (ii) a quadrature output signal based on a quadrature version of the filtered signal; and measuring, within photodetectors, in-phase photocurrents and quadrature photocurrents based respectively on the in-phase output signal and the quadrature output signal to extract information from the input signal.

18. The method of claim 17, wherein the filtered signal comprises a filtered version of the input signal, a delayed filtered version of the phase conjugate signal that is based on the induced delay, and a filtered version of the first continuous wave signal, and wherein the second output signals are based on differently weighted combinations of the filtered version of the first continuous wave signal and a product signal, the product signal being based on the filtered version of the input signal and the delayed filtered version of the phase conjugate signal.

19. The method of claim 17, wherein the photodetectors comprise:

a first pair of balanced photodetectors coupled with the in-phase output signal, the in-phase output signal comprising a positive in-phase version and a negative in-phase version; and a second pair of balanced photodetectors coupled with the quadrature output signal, the quadrature output signal comprising a positive quadrature version and a negative quadrature version.

20. The method of claim 17, comprising:
adjusting the induced delay based on a change in the baud rate.

21. The method of claim 17, comprising:
compensating, within the filter, for a relative phase between the input signal and the continuous wave signal; and
adjusting, within the filter, one or more amplitude levels of one or more of the input signal, the phase conjugate signal, or the continuous wave signal.

22. The method of claim 17, wherein the first nonlinear element comprises a periodically poled lithium niobate waveguide.

23. The method of claim 17, wherein a quasi phase matching (QPM) wavelength of each of the second nonlinear elements is temperature tuned to a QPM wavelength of the first nonlinear element.

* * * * *